(12) United States Patent
Luo

(10) Patent No.: US 12,140,856 B1
(45) Date of Patent: Nov. 12, 2024

(54) INTELLIGENT PANORAMA PHOTOGRAPHIC PLATFORM

(71) Applicant: Shenzhen Luoyan Technology Co., Ltd., Shenzhen (CN)

(72) Inventor: Yan Luo, Shenzhen (CN)

(73) Assignee: Shenzhen Luoyan Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/664,275

(22) Filed: May 14, 2024

(51) Int. Cl.
*G03B 37/02* (2021.01)
*G03B 17/56* (2021.01)

(52) U.S. Cl.
CPC .......... *G03B 37/02* (2013.01); *G03B 17/561* (2013.01)

(58) Field of Classification Search
None
See application file for complete search history.

(56) References Cited

U.S. PATENT DOCUMENTS

| 2,448,084 | A  | * | 8/1948  | Davis ................... G03B 35/04 396/419 |
| 9,618,830 | B1 | * | 4/2017  | Nicholas ............... G03B 15/06 |
| 11,500,271 | B2 |  | 11/2022 | Liu et al. |
| 11,947,246 | B1 | * | 4/2024  | Zhang ................ G03B 15/041 |
| 12,001,122 | B2 | * | 6/2024  | Xiao ..................... G03B 21/58 |
| 2019/0317383 | A1 | * | 10/2019 | Llewelyn-Davies .. H04N 23/54 |
| 2021/0286236 | A1 | * | 9/2021  | Kato ..................... H04N 13/221 |
| 2024/0173633 | A1 | * | 5/2024  | Zhang ................... A63G 31/02 |

* cited by examiner

*Primary Examiner* — Rodney E Fuller

(57) ABSTRACT

An intelligent panorama photographic platform is provided, comprising a tabletop mechanism, a rotating mechanism, a folding arm mechanism and an auxiliary mechanism, wherein the rotating mechanism is disposed at an upper end of the tabletop mechanism, the folding arm mechanism is disposed at a left end of the rotating mechanism, the auxiliary mechanism is disposed at a right end of the rotating mechanism.

3 Claims, 4 Drawing Sheets

INTELLIGENT PANORAMA PHOTOGRAPHIC PLATFORM

FIELD

The present disclosure relates to the technical field of shooting, and in particular, to an intelligent panorama photographic platform.

BACKGROUND

Photographic is the use of cameras and video recorders to record the image of people and objects. There are different photographic techniques for different scenes, including night shooting, rain shooting, building shooting, portrait shooting, etc., and film dynamic art photographic is also a type of shooting. However, all these shootings must follow certain principles. With the progress of science and technology, photographic is becoming more and more simple, more and more popular.

The existing photographic table is not convenient for height adjustment, angle of view adjustment, and the overall weight of the product is large and is inconvenient to carry it, and in addition, the reserved interface is few.

SUMMARY

An object of the present disclosure is to provide an intelligent panorama photographic platform to solve the problem proposed in the backgrounds above that it is not convenient for height adjustment, angle of view adjustment, and the overall weight of the product is large and is inconvenient to carry it, and in addition, the reserved interface is few.

In order to achieve the above purpose, the present disclosure provides the following technical solution: An intelligent panorama photographic platform, comprising a tabletop mechanism, a rotating mechanism, a folding arm mechanism and an auxiliary mechanism, wherein the rotating mechanism is disposed at an upper end of the tabletop mechanism, the folding arm mechanism is disposed at a left end of the rotating mechanism, the auxiliary mechanism is disposed at a right end of the rotating mechanism; the tabletop mechanism comprises a plurality of foot cups, a base body, a supporting rod body, a protecting block, a rotating frame fixing member, a tabletop fixing member, a hand screw and a tabletop body, wherein four foot cups are fixed at a lower end of the base body, the base body and one end of the supporting rod body are fixed by thread that comes with the supporting rod body, the other end of the supporting rod body is mounted with the tabletop fixing member, the rotating frame fixing member is built-in with the protecting block and the hand screw, and tabletop body is mounted on the tabletop fixing member. The tabletop body is of acrylic matte material, which can greatly reduce the overall weight of the product and is easy to handle. Furthermore, the matte material effectively prevents strong reflection during shooting, which is not conducive to shooting, etc. Moving the rotating fixing member up and down can synchronously adjust the height of the rotating portion to reach the requirements of on-demand shooting. The built-in protecting block of the rotating fixing member can protect the outer surface of the supporting rod body when the rotating fixing member is fixed by hand screw.

Preferably, the rotating mechanism comprises a rotating connecting member, a bearing body, a bearing fixing member, a carbon fiber round pipe, a folding arm fixing member, a reserved supporting rod fixing member, a green screen fixing member and a balance weight. The bearing body is built into the rotating connecting member up and down, and is sleeved on the supporting rod body with the rotating frame fixing member, and the rotating frame fixing member supports the rotating connecting member below the rotating connecting member.

Preferably, the bearing fixing member is disposed on an upper end of the rotating connecting member.

Preferably, the balance weight is disposed on one end of the carbon fiber round pipe, at which end the green screen body is mounted. The carbon fiber round pipes are used for mounting the folding arm fixing member, the reserved supporting rod fixing member, the green screen fixing member and other mounting members. The mounting method is to be sleeved on the carbon fiber round pipe, and fixed by the hand screw. The end of the carbon fiber round pipe at which the green screen body is mounted is provided with the balance weight, which effectively ensures that the product still maintains the balance at both ends when there is too much photographic devices at the other end. The carbon fiber round pipe material is light in weight and high hardness, reducing the weight of rotation and transportation, at the same time, it is not easy to deform, and it can be fixed by buckles and hand screws, which can achieve the effect of quick disassembly and quick assembly. One end of the reserved supporting rod is provided with an international standard ¼", ⅜" screw, which is used for mounting various photographic devices such as fill light, spotlight, etc., to add the expansion of photographic functions.

Preferably, the folding mechanism comprises a folding arm body, a folding arm base, a folding arm pan-tilt, a plastic gasket and a butting screw, wherein the folding arm body is divided into two sections of a long section and a short section, and the two sections are fixed by the butting screw, and the plastic gasket is added at the counterbore of the folding arm body, at which counterbore the butting screw is mounted. The plastic gasket is slightly convex after mounting, and the plasticity of the plastic gasket can play the role of fastening the folding frame to ensure that the folding frame will be folded after receiving a certain force. The butting screw has a position limiting function to prevent the screw from rotating during the rotation of the folding arm body, and the folding adjustment of the two sections of the folding arms can adjust the photographic height and photographic angle of view.

Preferably, one end of the folding arm body is mounted on the folding arm base by means of the butting screw and the hand screw, and the other end is mounted with the folding arm pan-tilt by means of the butting screw.

Preferably, the auxiliary mechanism comprises a green screen holder, the green screen body, the reserved supporting rod connecting member and the reserved supporting rod body, and the reserved supporting rod connecting member is disposed on one end of the carbon fiber round pipe, at which end the folding arm body is mounted. The green screen body is made of PVC+ front cloth with a black back, which has a certain hardness and is completely opaque, which is more conducive to the processing of later images. The green screen body and the green screen supporting frame are fixed by Velcro, and the green screen body has a certain hardness, so that it is convenient for the green screen body to ensure that the outer surface is completely flat without creases when fixed. The green screen supporting frame and the supporting frame are fixed by a butting screw. The upper end of the green screen is reserved with international standard ¼" and ⅜" screw holes, which is convenient for the fixed use of various other photographic device, which can ensure that the green screen body is bent at a certain angle to achieve the effect of surrounding the table, and ensure that the green screen body of the photographic background is distributed in the entire photographic background, which greatly facilitates the post-photographic picture processing.

Compared with the prior art, the beneficial effects of the present application are:

1. According to the intelligent panorama photographic platform, the tabletop body is of acrylic matte material, which can greatly reduce the overall weight of the product and is convenient for handling, and the matte material effectively prevents strong reflection during shooting, which is not conducive to shooting, and improves the carrying capacity of the intelligent panorama photographic platform.

2. According to the intelligent panorama photographic platform, moving the rotating fixing member up and down can synchronously adjust the height of the rotating portion to meet the requirements of on-demand shooting. The built-in protecting block of the rotating fixing member can protect the outer surface of the supporting rod body when the rotating fixing member is fixed by hand screw. The carbon fiber round pipes are used for mounting the folding arm fixing member, the reserved supporting rod fixing member, the green screen fixing member and other mounting members. The mounting method is to be sleeved on the carbon fiber round pipe, and fixed by the hand screw. The end of the carbon fiber round pipe at which the green screen is mounted is provided with the balance weight, which effectively ensures that the product still maintains the balance at both ends when there is too much photographic devices at the other end. The carbon fiber round pipe material is light in weight and high hardness, reducing the weight of rotation and transportation, at the same time, it is not easy to deform, which increases the usability of the intelligent panorama photographic platform.

3. According to the intelligent panorama photographic platform, the green screen body is made of PVC+ front cloth with a black back, which has a certain hardness and is completely opaque, which is more conducive to the processing of later images. The green screen body and the green screen supporting frame are fixed by Velcro, and the green screen body has a certain hardness, so that it is convenient for the green screen body to ensure that the outer surface is completely flat without creases when fixed. The green screen supporting frame and the supporting frame are fixed by a butting screw, which can ensure that the green screen body is bent at a certain angle to achieve the effect of surrounding the table, and ensure that the green screen body of the photographic background is distributed in the entire photographic background, which greatly facilitates the post-photographic picture processing, which increases the usability of the intelligent panorama photographic platform.

1. tabletop mechanism, 101. foot cup, 102. base body, 103. supporting rod body, 104. protecting block, 105. rotating frame fixing member, 106. tabletop fixing member, 107. hand screw, 108. tabletop body, 2. rotating mechanism, 201. rotating connecting member, 202. bearing body, 203. bearing fixing member, 204. carbon fiber round pipe, 205. folding arm fixing member, 206. reserved supporting rod fixing member, 207. green screen fixing member, 208. balance weight, 3. folding mechanism, 301. folding arm body, 302. folding arm base, 303. folding arm pan-tilt, 304. plastic gasket, 305. butting screw, 4. auxiliary mechanism, 401. green screen holder, 402. green screen body, 403. reserved supporting rod connecting member, and 404. reserved supporting rod body.

DETAILED DESCRIPTION OF EMBODIMENTS

In the following, the technical solutions in the embodiments of the present disclosure will be clearly and completely described in conjunction with the accompanying drawings in embodiments of the present disclosure. Obviously, the described embodiments are only a part of the embodiments of the present application rather than all embodiments. Based on the embodiments in the present disclosure, all other embodiments obtained by those of ordinary skill in the art without making creative labor, fall within the scope of the protection of the present disclosure.

Figure 1:
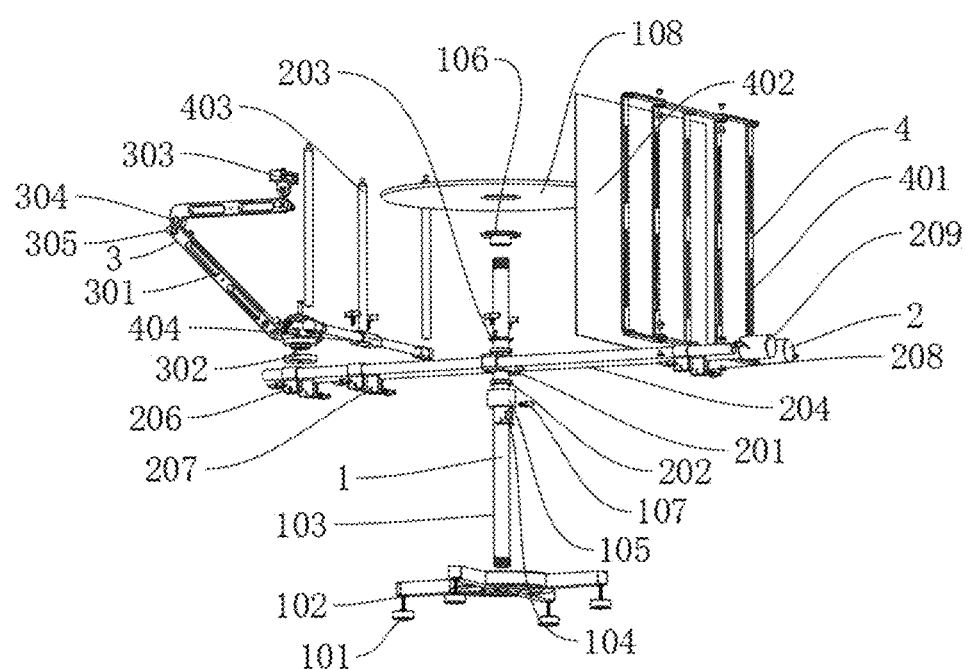
FIG. 1 is a schematic diagram of the three-dimensional structure of the platform according to the present disclosure.
Figure 2:
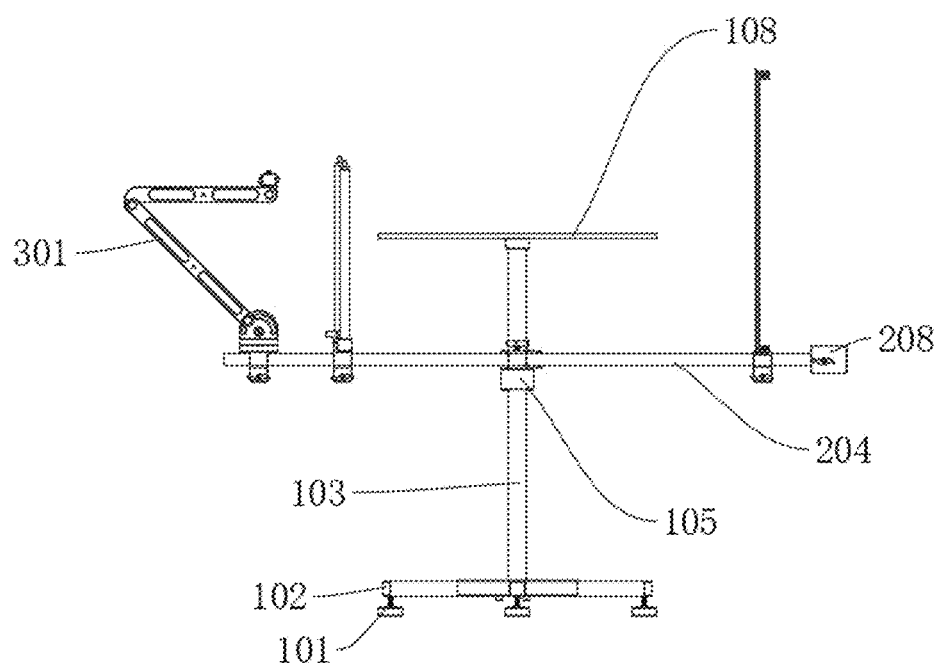
FIG. 2 is a schematic diagram of the sectional structure of the platform according to the present disclosure.
Figure 3:
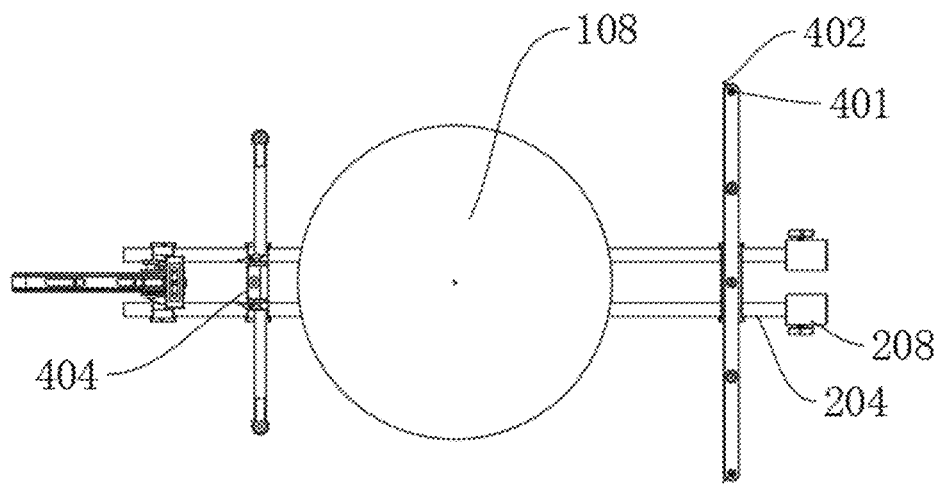
FIG. 3 is a schematic diagram of the rotating mechanism of the platform according to the present disclosure.
Figure 4:
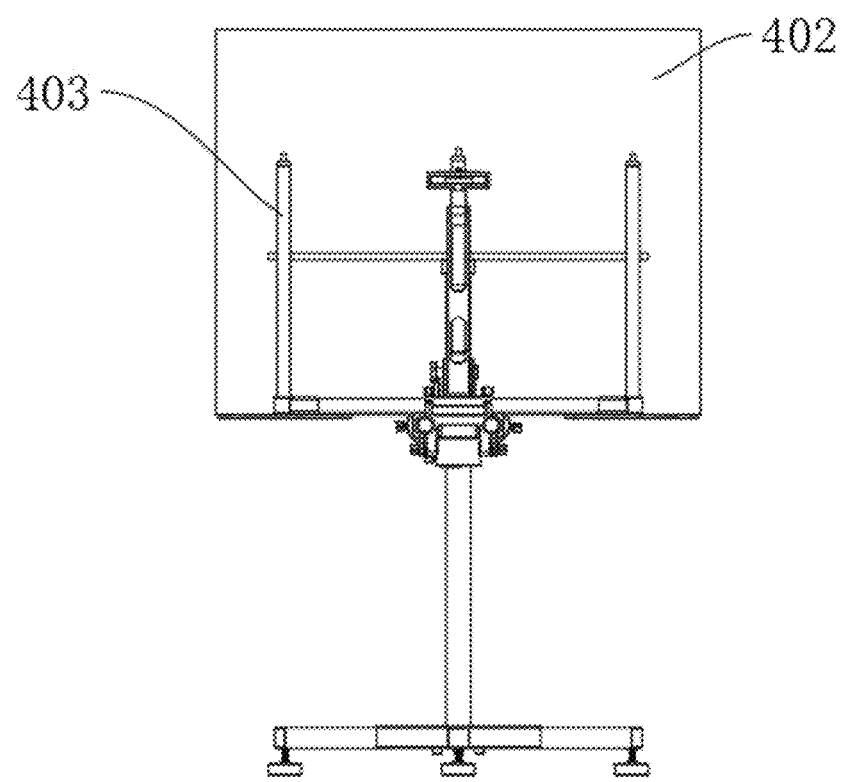
FIG. 4 is a schematic diagram of the auxiliary mechanism of the platform according to the present disclosure.

Referring FIGS. 1-4, the present disclosure provides a technical scheme as follows. An intelligent panorama photographic platform, comprising a tabletop mechanism 1, a rotating mechanism 2, a folding mechanism 3 and an auxiliary mechanism 4, wherein the rotating mechanism 2 is disposed at an upper end of the tabletop mechanism 1, the folding mechanism 3 is disposed at a left end of the rotating mechanism 2, the auxiliary mechanism 4 is disposed at a right end of the rotating mechanism 2; the tabletop mechanism 1 comprises a plurality of foot cups 101, a base body 102, a supporting rod body 103, a protecting block 104, a rotating frame fixing member 105, a tabletop fixing member 106, a hand screw 107 and a tabletop body 108, wherein four foot cups 101 are fixed at a lower end of the base body 102, the base body 102 and one end of the supporting rod body 103 are fixed by thread that comes with the supporting rod body 103, the other end of the supporting rod body 103 is mounted with the tabletop fixing member 106, the rotating frame fixing member 105 is built-in with the protecting block 104 and the hand screw 107, and tabletop body 108 is mounted on the tabletop fixing member 106.

The rotating mechanism 2 comprises a rotating connecting member 201, a bearing body 202, a bearing fixing member 203, a carbon fiber round pipe 204, a folding arm fixing member 205, a reserved supporting rod fixing member 206, a green screen fixing member 207 and a balance weight 208, wherein the bearing body 202 is built into the rotating connecting member 201 up and down, and is sleeved on the supporting rod body 103 with the rotating frame fixing member 105, and the rotating frame fixing member 105 supports the rotating connecting member 201 below the rotating connecting member 201. The bearing fixing member 203 is disposed on an upper end of the rotating connecting member 201. The balance weight 208 is disposed on one end of the carbon fiber round pipe 204, at which end the green screen body 402 is mounted. Moving the rotating fixing member up and down can synchronously adjust the height of the rotating portion to reach the requirements of on-demand shooting. The built-in protecting block 104 of the rotating fixing member can protect the outer surface of the supporting rod body 103 when the rotating fixing member is fixed by hand screw 107. The carbon fiber round pipes 204 are used for mounting the folding arm fixing member 205, the reserved supporting rod fixing member 206, the green screen fixing member 207 and other mounting members. The mounting method is to be sleeved on the carbon fiber round pipe 204, and fixed by the hand screw 107. The end of the carbon fiber round pipe 204 at which the green screen body 402 is mounted is provided with the balance weight 208, which effectively ensures that the product still maintains the balance at both ends when there is too much photographic devices at the other end. The carbon fiber round pipe 204 material is light in weight and high hardness, reducing the weight of rotation and transportation, at the same time, it is not easy to deform.

The folding mechanism 3 comprises a folding arm body 301, a folding arm base 302, a folding arm pan-tilt 303, a plastic gasket 304 and a butting screw 305. The folding arm body 301 is divided into two sections of a long section and a short section, the two sections are fixed by the butting screw 305, and the plastic gasket 304 is added at the counterbore of the folding arm body 301, at which counterbore the butting screw 305 is mounted.

The auxiliary mechanism 4 comprises a green screen holder 401, the green screen body 402, the reserved supporting rod connecting member 403 and a reserved supporting rod body 404, and the reserved supporting rod connecting member 403 is disposed on one end of the carbon fiber round pipe 204, at which end the folding arm body 301 is mounted.

Working principle: The tabletop body 108 is of acrylic matte material, which can greatly reduce the overall weight of the product and is easy to handle. Furthermore, the matte material effectively prevents strong reflection during shooting, which is not conducive to shooting, etc. Moving the rotating fixing member up and down can synchronously adjust the height of the rotating portion to reach the requirements of on-demand shooting. The built-in protecting block 104 of the rotating fixing member can protect the outer surface of the supporting rod body 103 when the rotating fixing member is fixed by hand screw 17. The built-in protecting block 104 of the rotating fixing member can protect the outer surface of the supporting rod body 103 when the rotating fixing member is fixed by hand screw 107. The carbon fiber round pipes 204 are used for mounting the folding arm fixing member 205, the reserved supporting rod fixing member 206, the green screen fixing member 207 and other mounting members. The mounting method is to be sleeved on the carbon fiber round pipe 204, and fixed by the hand screw 107. The end of the carbon fiber round pipe 204 at which the green screen body 402 is mounted is provided with the balance weight 208, which effectively ensures that the product still maintains the balance at both ends when there is too much photographic devices at the other end. The carbon fiber round pipe 204 material is light in weight and high hardness, reducing the weight of rotation and transportation, at the same time, it is not easy to deform. The green screen body 40 is made of PVC+ front cloth with a black back, which has a certain hardness and is completely opaque, which is more conducive to the processing of later images. The green screen body 402 and the green screen supporting frame 401 are fixed by Velcro, and the green screen body 402 has a certain hardness, so that it is convenient for the green screen body 402 to ensure that the outer surface is completely flat without creases when fixed. The green screen supporting frame 401 and the supporting frame are fixed by a butting screw 305, which can ensure that the green screen body 402 is bent at a certain angle to achieve the effect of surrounding the table, and ensure that the green screen body 402 of the photographic background is distributed in the entire photographic background, which greatly facilitates the post-photographic picture processing.

Finally, it should be noted that the above content is only used to illustrate the technical solution of the present disclosure, and not to limit the scope of protection of the present disclosure, and the simple modification or equivalent replacement of the technical solution of the present disclosure by a person skilled in the art does not deviate from the essence and scope of the technical solution of the present disclosure.

What is claimed is:

1. An intelligent panorama photographic platform, comprising a tabletop mechanism (1), a rotating mechanism (2), a folding mechanism (3) and an auxiliary mechanism (4), wherein the rotating mechanism (2) is disposed at an upper end of the tabletop mechanism (1), the folding mechanism (3) is disposed at a left end of the rotating mechanism (2), the auxiliary mechanism (4) is disposed at a right end of the rotating mechanism (2); the tabletop mechanism (1) comprises a plurality of foot cups (101), a base body (102), a supporting rod body (103), a protecting block (104), a rotating frame fixing member (105), a tabletop fixing member (106), a hand screw (107) and a tabletop body (108), wherein four foot cups (101) are fixed at a lower end of the base body (102), the base body (102) and one end of the supporting rod body (103) are fixed by thread that comes with the supporting rod body (103), the other end of the supporting rod body (103) is mounted with the tabletop fixing member (106), the rotating frame fixing member (105) is built-in with the protecting block (104) and the hand screw (107), and tabletop body (108) is mounted on the tabletop fixing member (106), wherein the rotating mechanism (2) comprises a rotating connecting member (201), a bearing body (202), a bearing fixing member (203), a carbon fiber round pipe (204), a folding arm fixing member (205), a reserved supporting rod fixing member (206), a green screen fixing member (207) and a balance weight (208), wherein the bearing body (202) is built into the rotating connecting member (201) up and down, and is sleeved on the supporting rod body (103) with the rotating frame fixing member (105), and the rotating frame fixing member (105) supports the rotating connecting member (201) below the rotating connecting member (201), wherein the bearing fixing member (203) is disposed on an upper end of the rotating connecting member (201), wherein the balance weight (208) is disposed on one end of the carbon fiber round pipe (204), at which end a green screen body (402) is mounted, wherein the folding mechanism (3) comprises a folding arm body (301), a folding arm base (302), a folding arm pan-tilt (303), a plastic gasket (304) and a butting screw (305), wherein the folding arm body (301) is divided into two sections of a long section and a short section, the two sections are fixed by the butting screw (305), and the plastic gasket (304) is added at the counterbore of the folding arm body (301), at which counterbore the butting screw (305) is mounted.

2. The intelligent panorama photographic platform of claim 1, wherein one end of the folding arm body (301) is mounted on the folding arm base (302) by means of the butting screw (305) and the hand screw (107), and the other end is mounted with the folding arm pan-tilt (303) by means of the butting screw (305).

3. The intelligent panorama photographic platform of claim 2, wherein the auxiliary mechanism (4) comprises a green screen holder (401), the green screen body (402), a reserved supporting rod connecting member (403) and a reserved supporting rod body (404), and the reserved supporting rod connecting member (403) is disposed on one end of the carbon fiber round pipe (204), at which end the folding arm body (301) is mounted.

\* \* \* \* \*